United States Patent
Itoga et al.

(10) Patent No.: US 7,782,727 B2
(45) Date of Patent: Aug. 24, 2010

(54) OPTICAL DISK PROCESSING APPARATUS

(75) Inventors: Hisanori Itoga, Hamamatsu (JP); Seiya Yamada, Hamamatsu (JP); Tatsuo Fushiki, Hamamatsu (JP); Hiroshi Kubo, Odawara (JP); Michihiro Shibata, Odawara (JP)

(73) Assignees: Yamaha Corporation, Hamamatsu-shi (JP); Fujifilm Corporation, Tokyo (JP)

( * ) Notice: Subject to any disclaimer, the term of this patent is extended or adjusted under 35 U.S.C. 154(b) by 320 days.

(21) Appl. No.: 11/909,887

(22) PCT Filed: Sep. 29, 2006

(86) PCT No.: PCT/JP2006/319585

§ 371 (c)(1),
(2), (4) Date: Sep. 27, 2007

(87) PCT Pub. No.: WO2007/037437

PCT Pub. Date: Apr. 5, 2007

(65) Prior Publication Data

US 2009/0268578 A1    Oct. 29, 2009

(30) Foreign Application Priority Data

Sep. 30, 2005  (JP) .............................. 2005-288741

(51) Int. Cl.
G11B 7/00    (2006.01)

(52) U.S. Cl. ................ 369/53.22; 369/94; 369/53.37; 369/47.22; 369/47.55

(58) Field of Classification Search ............. 369/44.32, 369/44.26, 44.29, 47.22, 47.23, 47.24, 47.55, 369/53.2, 53.22, 53.31, 53.44, 53.45, 53.37, 369/59.13, 59.14, 94, 100

See application file for complete search history.

(56) References Cited

U.S. PATENT DOCUMENTS

| 5,959,280 | A | 9/1999 | Kamatani |
| 6,826,139 | B1 | 11/2004 | Oh et al. |
| 7,675,535 | B2* | 3/2010 | Honda et al. ............... 347/224 |
| 2001/0026531 | A1 | 10/2001 | Onodera et al. |
| 2004/0004912 | A1 | 1/2004 | Morishima |
| 2005/0265145 | A1* | 12/2005 | Nakane et al. ........... 369/44.27 |

(Continued)

FOREIGN PATENT DOCUMENTS

JP    9-27143 A    1/1997

(Continued)

OTHER PUBLICATIONS

European Search Report dated Oct. 16, 2009 (five (5) pages).

(Continued)

*Primary Examiner*—Wayne R Young
*Assistant Examiner*—Brenda Bernardi
(74) *Attorney, Agent, or Firm*—Crowell & Moring LLP (57) ABSTRACT

An optical pickup is opposed to an inner-radius portion of an optical disc that is set, and pits (a modulation signal) are read by applying laser light for a DVD to the inner-radius portion. The read-out modulation signal is decoded by inputting it to a CD decoder. If decoded disc information includes particular verification data, the optical disc is judged to be a legitimate optical disc of a particular type and formation of a visible image on the label surface is permitted.

12 Claims, 4 Drawing Sheets

U.S. PATENT DOCUMENTS

| | | | |
|---|---|---|---|
| 2006/0087949 A1* | 4/2006 | Lambert et al. | 369/100 |
| 2006/0114794 A1* | 6/2006 | Suzuki et al. | 369/112.01 |
| 2006/0151605 A1 | 7/2006 | Miyoshi et al. | |

FOREIGN PATENT DOCUMENTS

| | | |
|---|---|---|
| JP | 2002-203321 A | 7/2002 |
| JP | 2004-39027 A | 2/2004 |
| JP | 2005-135464 A | 5/2005 |
| JP | 2006-196062 A | 7/2006 |
| WO | WO 2004/042729 A1 | 5/2004 |

OTHER PUBLICATIONS

International Search Report dated Oct. 31, 2007 (One (1) page).
English translation of Japanese Office Action dated Jun. 11, 2009 (Nine (9) pages).

* cited by examiner

| DISC INFORMATION | LASER POWER | FOCUS GAIN |
|---|---|---|
|  |  |  |

OPTICAL DISK PROCESSING APPARATUS

TECHNICAL FIELD

The present invention relates to an optical disc processing apparatus for forming a visible image such as a text or a photograph on the label surface of an optical disc.

BACKGROUND ART

As for optical disc processing apparatus for recording data on an optical disc such as a CD-R or a DVD-R, a technique for forming a visible image such as a text or a photograph on the data recording surface of an optical disc has been proposed (refer to Patent document 1, for example).

This technique utilizes the fact that data recording on an optical disc is performed by changing the color of the dye by applying laser light to a dye layer. A visible image is formed as a color density variation of the dye by applying laser light to the disc surface in accordance with the density of a visible image.

Another technique has been proposed in which a dye layer is formed also on the label surface of an optical disc and a label image is formed by an optical disc processing apparatus instead of writing a disc title or the like by hand or printing it with an ink-jet printer (refer to Patent document 2, for example).

Patent document 1: JP-A-2004-039027
Patent document 2: JP-A-2002-203321

DISCLOSURE OF THE INVENTION

Problems to be Solved by the Invention

Where a dye layer is formed on the label surface of an optical disc as in Patent document 2, the dye layer need not always be of the same kind as that on the data recording surface. For example, no track is formed on the label surface because data need not be recorded thereon. Since the durability requirement of the dye of the label surface is less severe than that of the dye of the data recording surface, even a dye whose color changes rapidly at low temperatures can be used for the label surface. Preferable dyes are such that a color change caused by illumination with laser light having recording intensity contributes more to a density change in the visible range for a user than to a reflectance change caused by laser light having reading intensity.

If a disc as described above is realized on whose label surface a dye layer is formed that is specialized in image drawing, an optical disc processing apparatus needs to apply laser light to the label surface with a different setting than for data recording or image drawing on the data recording surface.

Therefore, when a disc is set in an optical disc processing apparatus with prescribed orientation so that laser light can be applied to the label surface of such an optical disc, the optical disc processing apparatus need to detect this fact and apply laser light with a suitable setting. Conversely, it is also necessary to prohibit writing of a visible image on the label surface of such an optical disc when it is set in an ordinary optical disc processing apparatus in such a manner that a visible image can be written to its label surface. This is because a beautiful visible image cannot be formed if visible image formation is performed with a non-optimum setting.

An object of the present invention is therefore to provide an optical disc processing apparatus which permits formation of a visible image only when the fact that a particular optical disc in which a dye layer is formed on its label surface is set is recognized.

Means for Solving the Problems

This invention is characterized by comprising first reading means for reading a modulation signal from a first-structure optical disc having a first layered structure; second reading means for reading a modulation signal from a second-structure optical disc having a second layered structure; first decoding means for decoding a modulation signal that is recorded in a format of the first-structure optical disc; second decoding means for decoding a modulation signal that is recorded in a format of the second-structure optical disc; and disc judging means for permitting execution of a particular processing operation if a condition is satisfied that the second decoding means succeeds in decoding a modulation signal read by the first reading means from a first-structure optical disc that is set.

This invention is characterized in that, in the above invention, the disc judging means permits execution of the particular processing operation if a further condition is satisfied that data produced by the decoding by the second decoding means has particular contents.

This invention is characterized in that, in the above invention, the first-structure optical disc is a DVD and the second-structure optical disc is a CD, and the modulation signal that is recorded in the format of the second-structure optical disc is an EFM signal that is written with a minimum pit length of 0.83 to 0.98 μm and a track pitch of 1.50 to 1.70 μm.

The above invention is an invention relating to an apparatus for reading an optical disc in which a modulation signal is recorded in the format of the second-structure optical disc such as a CD or the first-structure optical disc such as a DVD. The second decoding means decodes a modulation signal read by the first reading means. Ordinary optical disc processing apparatus are provided with only the function of decoding, with the first decoding means, a modulation signal read by the first reading means and the function of decoding, with the second decoding means, a modulation signal read by the second reading means. Therefore, when a special optical disc that cannot be read by ordinary apparatus is set, the optical disc processing apparatus according to this invention permits execution of particular processing on the optical disc only if it reads data from the disc and recognizes that the disc is a special disc. This invention may be such that execution of the particular processing is permitted if another condition is satisfied that the read-out data has particular contents.

In this case, since a decoder for the second-structure optical disc such as a CD can be used for decoding a modulation signal, it is not necessary to provide a new component for reading the above-mentioned special optical disc.

This invention is characterized in that, in the above invention, the particular processing operation is processing of forming a visible image with laser light on a surface of the disc that is set.

In the invention, processing of forming a visible image is performed only if it is judged that the subject surface is a disc label surface on the basis of disc information. Therefore, whereas a beautiful visible image can always be formed by setting parameters that are most suitable for the disc, processing of forming a visible image can be prevented from being performed erroneously on another type of optical disc (e.g., its label surface) that is configured similarly.

ADVANTAGES OF THE INVENTION

In this invention, when a special optical disc on which a modulation signal is recorded in the format of the second-structure optical disc (e.g., CD) or the first-structure optical disc (e.g., DVD) is read, a particular processing operation is performed only if data obtained by decoding the read-out modulation signal has particular contents. Therefore, the particular processing operation can be performed by recognizing the special optical disc properly. Furthermore, the particular processing operation can be prevented from being performed on other kinds of discs.

Since a decoder for the second-structure optical disc for decoding a modulation signal that is recorded in a modulation format of the CD or the like can be used for decoding a modulation signal, it is not necessary to provide a new decoder etc. for reading the above-mentioned special optical disc.

In this invention, only if it is judged that the subject surface of the above-mentioned special optical disc is a writable label surface, visible image formation processing is performed on the label surface. Therefore, visible image formation processing is performed by setting various parameters suitable for the label surface, whereby a beautiful, high-contrast visible image can always be formed. Furthermore, visible image formation processing can be prevented from being performed erroneously on the label surface of another type of optical disc that is configured similarly.

BEST MODE FOR CARRYING OUT THE INVENTION

An optical disc processing apparatus according to an embodiment of the present invention will be hereinafter described with reference to the drawings.

Figure 1:
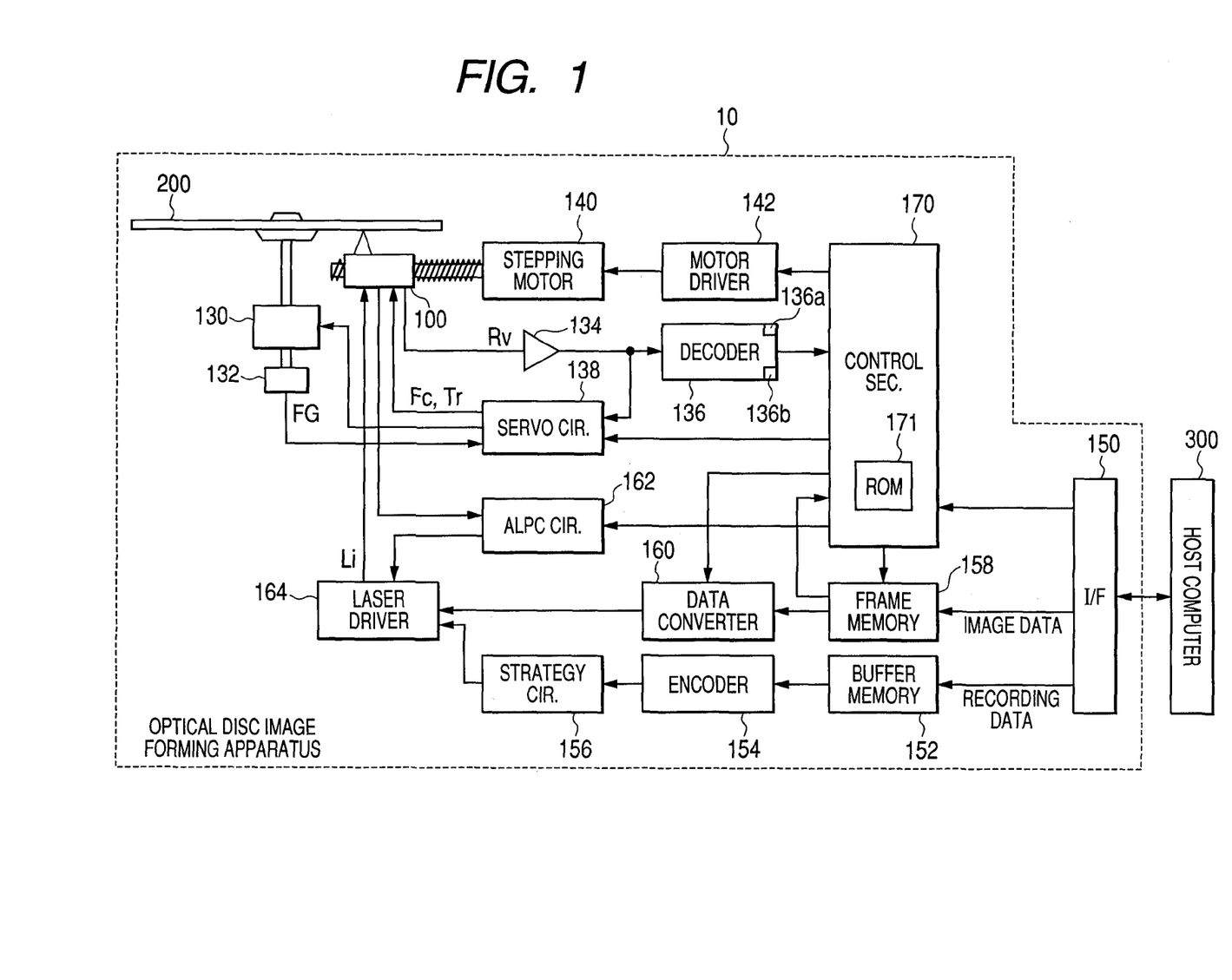
FIG. 1 is a block diagram showing a general configuration of an optical disc processing apparatus according to an embodiment of the present invention.

FIG. 1 is a block diagram showing a general configuration of an optical disc processing apparatus according to the embodiment of the invention. As shown in FIG. 1, the optical disc processing apparatus 10 is equipped with an optical pickup 100, a spindle motor 130, a rotation detector 132, an RF (radio frequency) amplifier 134, a decoder 136, a servo circuit 138, a stepping motor 140, a motor driver 142, an interface 150, a buffer memory 152, an encoder 154, a strategy circuit 156, a frame memory 158, a data converter 160, an automatic laser power control (ALPC) circuit 162, a laser driver 164, and a control section 170. The optical disc processing apparatus 10 is connected to a host computer 300 via the interface 150.

The spindle motor 130 rotates an optical disc 200 which is held by a holding mechanism (not shown). The rotation detector outputs a signal FG having a frequency that corresponds to a rotation speed of the spindle motor 130.

The optical pickup 100 is equipped with laser diodes, plural lenses such as an objective lens, a tracking servo mechanism, a focus servo mechanism, etc., and applies, to the optical disc 200 which is rotating, laser light that is focused by the lenses. Being a combo pickup, the optical pickup 100 is equipped with a 780-nm laser diode for CDs and a 650-nm laser diode for DVDs.

The stepping motor 140 moves the optical pickup 100 in the radial direction of the optical disc 200. The motor driver 142 performs a step control by outputting a motor drive signal to the stepping motor 140 according to an instruction from the control section 170.

The RF amplifier 134 amplifies a photodetection signal Rv that is output from the optical pickup 100 and outputs an amplified signal to the decoder 136 and the servo circuit 138. The decoder 136 decodes the photodetection signal Rv received from the RF amplifier 134 and thereby demodulates data. The decoder 136 has a CD decoder 136a for decoding a CD-format-encoded signal (EFM signal) and a DVD decoder 136b for decoding a DVD-format-encoded signal ($8/16$ modulation signal).

The servo circuit 138 is composed of a rotation control section, a tracking servo section, and a focus servo section. The rotation control section performs a feedback control so that the rotation speed of the spindle motor 130 that is detected on the basis of the signal FG becomes equal to an angular speed or a linear speed of an instruction from the control section 170. The tracking servo section performs a tracking control on the optical pickup 100 on the basis of a tracking error signal that is output from the optical pickup 100. The focus servo section performs a focus control on the optical pickup 100 on the basis of a focus error signal that is output from the optical pickup 100.

Being a microcomputer including a CPU, the control section 170 manipulates the individual sections according to programs stored in a ROM 171, and thereby records information on the recording surface of the optical disc 200 or forms a visible image on the label surface of the optical disc 200.

As describe later, the control section 170 reads information (disc information) from pits that are formed in advance in an inner-radius portion of an optical disc set, judges whether or not a visible image can be formed on the label surface of the disc by illuminating it with a particular kind of laser light, and judges, on the basis of a result of this judgment, whether or not to form a visible image in response to a request for visible image formation from the host computer 300.

If the label surface of a disc set is such that a visible image can be formed thereon, the control section 170 reads, from the ROM 171, visible image formation parameters that are most suitable for the disc and sets those in the data converter 160, the ALPC circuit 162, etc.

The buffer memory 152 temporarily stores, in FIFO form, recording data that are received from the host computer 300 via the interface 150. The recording data are data to be recorded on the recording surface of the optical disc 200 in a prescribed recording format. The frame memory 158 stores visible image data that are received from the host computer via the interface 150. The visible image data are data to be used for drawing a visible image on the label surface of the optical disc 200.

The encoder 154 EFM-modulates or $8/16$-modulates the recording data that are read from the buffer memory 152 and outputs resulting data to the strategy circuit 156. The strategy circuit 156 performs time-axis correction processing etc. on a modulated signal that is supplied from the encoder 154, and outputs a resulting signal to the laser driver 164.

In forming a visible image on the optical disc 200, the data converter 160 reads visible image data corresponding to the current position of the optical pickup 100 and outputs a laser power value corresponding to the visible image data to the laser driver 164.

The ALPC circuit 162 is a circuit for controlling the intensity of laser light that is emitted from the laser diode. More specifically, the ALPC circuit 162 controls the current value of a drive signal Li so that the emission light quantity of the laser diode that is detected by a front monitor diode of the optical pickup 100 becomes equal to a target value (optimum laser power) specified by the control section 170.

In an information recording operation, the laser driver 164 generates a drive signal Li reflecting the details of the control of the ALPC circuit 162 according to the modulation data supplied from the strategy circuit 156 and supplies the drive signal Li to the laser diode of the optical pickup 100. In a visible image forming operation, the laser driver 164 generates a drive signal Li reflecting the details of the control of the ALPC circuit 162 according to the data produced through the conversion by the data converter 160 and supplies the drive signal Li to the laser diode of the optical pickup 100. In this manner, the intensity of the laser beam emitted from the laser diode is controlled so as to coincide with the target value that is supplied from the controller 170.

Figure 2:
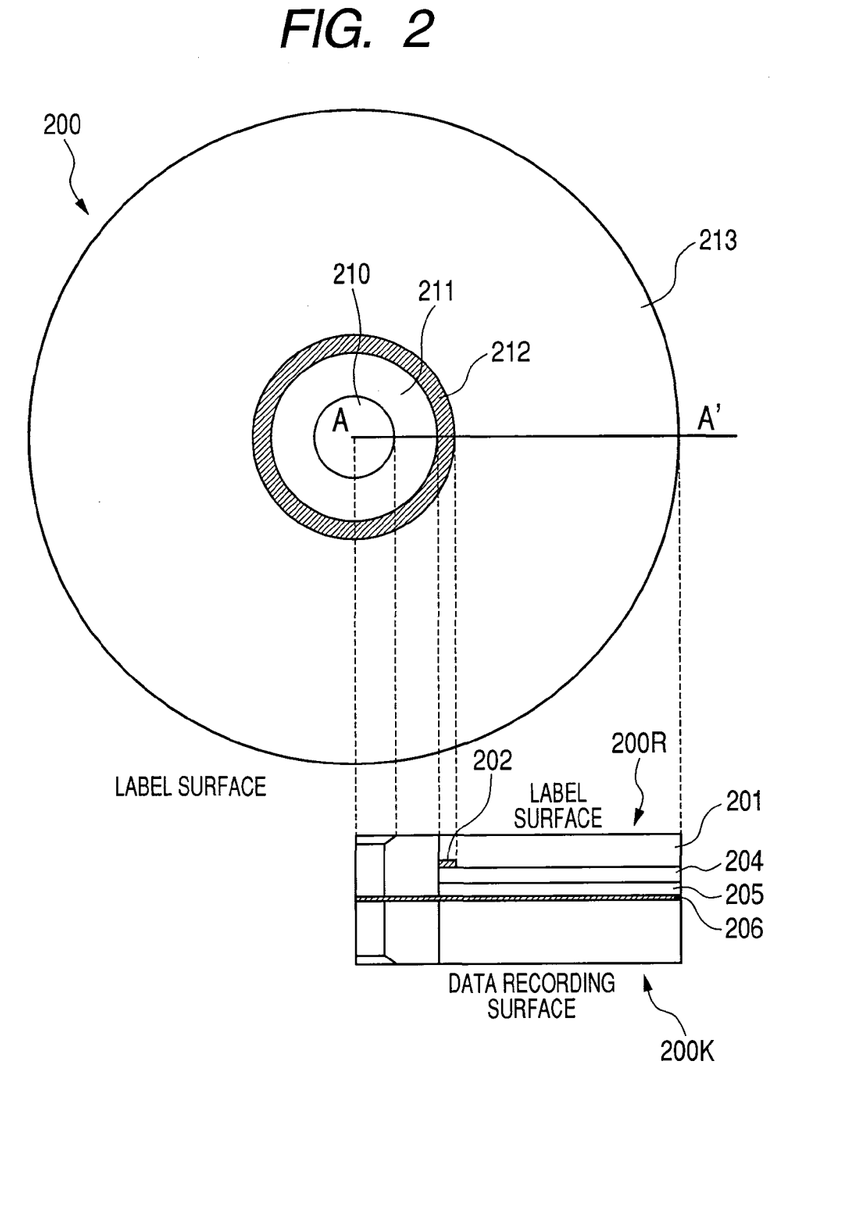
FIG. 2 is a schematic front view of the label surface and a sectional view of an optical disc which is used in the optical disc processing apparatus.

FIG. 2 is a schematic front view of the label surface and an A-A' sectional view of an optical disc on which a visible image can be formed. As shown in the A-A' sectional view of FIG. 2, the optical disc 200 is a DVD-R in which two base members 200K and 200R are bonded to each other. The label-surface-side base member 200R is configured in such a manner that a protective layer (polycarbonate substrate) 201 having an information recording layer 202, a dye layer (color-changing layer) 204, a reflection layer 205, and an adhesive layer 206 are laid in this order from the label surface side. As shown in the schematic front view, the optical disc 200 is configured in such a manner that a clamp area 211 is provided around a center hole 210 that is formed at the center and an information recording area 212 and an image drawing area 213 are formed in this order from the inner radius side around the clamp area 211.

The layered structure of the data-recording-surface-side base member 200K is the known structure of the DVD-R and hence is not shown in FIG. 2. The structure of the optical disc 200 shown in FIG. 2 is a schematic one and the ratio between the dimensions of the respective layers and areas need not always be the same as illustrated.

The protective layer 201 is a transparent polycarbonate substrate and transmits laser light without attenuating it.

The information recording layer 202 is a layer that is an inner-radius portion, formed on the side surface of the dye layer, of the polycarbonate substrate 201, and is a layer in which the information recording area 212 of the disc is to be formed. A track consisting of plural pits is formed in this layer, and disc information is written in the form of the pits. The disc information is recorded as the pits in the CD-ROM format. The disc information includes verification data etc. of the disc. In the label surface of the disc, no track is formed in the areas other than the information recording area 212 and hence the optical disc processing apparatus cannot perform a tracking servo control there using a track on the optical disc. The information recording layer 202 in which the disc information is recorded has a disc layered structure that does not allow ordinary CD recording/reproducing apparatus to read data from it. Since the positional relationship between the optical pickup and this layer is the same as or similar to that between the optical pickup and the data recording layer that is employed at the time of data recording, signal processing that precedes DVD decoding is possible as long as a DVD pickup is used.

The reason why the disc information is recorded in the information recording area 212 in the CD-ROM format is to prevent other, ordinary optical disc processing apparatus from reading out the information of this area. If an ordinary optical disc processing apparatus not having the function of forming a visible image on the label surface read the information of the information recording area 212, it might erroneously judge that the disc is a certain reproducible or writable disc and the disc or the apparatus itself might be damaged as a result of performing an erroneous operation such as seeking of a useless track. In view of this, information reading itself is disabled.

Since the disc information is recorded in the information recording area 212 in the CD-ROM format, it is difficult for ordinary CD recording/reproducing apparatus to even access the disc information that is located in the disc inside layer. Although ordinary DVD recording/reproducing apparatus can read out a signal itself corresponding to the disc information, they cannot decode a modulation signal because of the use of the CD-ROM format which is not compatible with the DVD format. As a result, ordinary recording/reproducing apparatus of either type cannot read the data of this area. An operation can be stopped before an erroneous operation is performed uselessly, whereby the disc or the apparatus is prevented from being damaged.

Where a similar disc is manufactured in which a dye layer is formed on the label surface in a layered structure that is similar to the above-described one, whether or not it is a legitimate optical disc can be judged by checking whether or not disc information is written by the above-described method. It is thus possible to prevent formation of a visible image on the label surface of such a similar disc. This makes it possible to prevent formation of an unclear, not beautiful visible image on a similar disc whose optimum parameter set is unknown or a similar disc without quality assurance.

The term "CD-ROM format standard" as used herein means a format in which an EFM signal is written with a minimum pitch length of 0.83 to 0.98 μm (0.83 μm in the standard) and a track pitch of 1.50 to 1.70 μm (1.60 μm in the standard). The DVD format standard prescribes that an 8/16 modulation signal should be written with a minimum pitch of 0.40 μm and a track pitch of 0.74 μm.

Where pits of the CD-ROM format cannot be read with a DVD laser, tracking cannot be performed by a differential push-pull (DPP) method using a sub-beam for a 0.74-μm-pitch track of a DVD. However, a differential phase detection (DPD) method which does not use a sub-beam enables tracking and hence reading of pits.

So that a clear, high-contrast visible image can be formed with visible light, the dye layer 204 is made of an organic dye that is different from a dye used in the recording layer formed on the data recording surface of the base member 200K. The former dye is changed in color by laser light whose power is lower than the latter dye is done so, and the former dye produces a larger reflectance change than the latter dye. The reflection layer 205 is made of a metal such as aluminum and hence reflects laser light. The adhesive layer 206 is a layer for bonding the label-surface-side base member 200R and the data-recording-surface-side base member 200K to each other.

Figure 4:
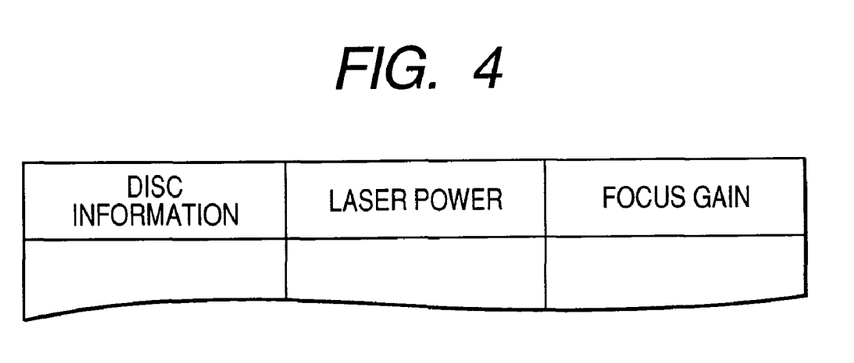
FIG. 4 shows a general structure of a parameter table.

So that a beautiful, high-contrast visible image is formed on the label surface, in the optical disc processing apparatus 10, an optimum laser power value and focus gain are stored in a parameter table of the RAM 171 for each set of a disc maker and a disc type. Since a disc maker and a disc type can be judged on the basis of the disc information of the information recording area 212, an optimum laser power value and focus gain are stored in the parameter table so as to be correlated with disc information as shown in FIG. 4. The laser power values and the focus gains stored in the parameter table are ones that were determined by experiments.

To form a visible image on the label surface of an optical disc, the control section 170 of the optical disc processing apparatus 10 reads out the disc information that is recorded in the information recording area 212 of the optical disc 200 set, reads a laser power value and a focus gain suitable for the optical disc 200 from the parameter table of the ROM 171 on the basis of the read-out information, and sets the data converter 160 and the servo circuit 138 accordingly.

Figure 3:
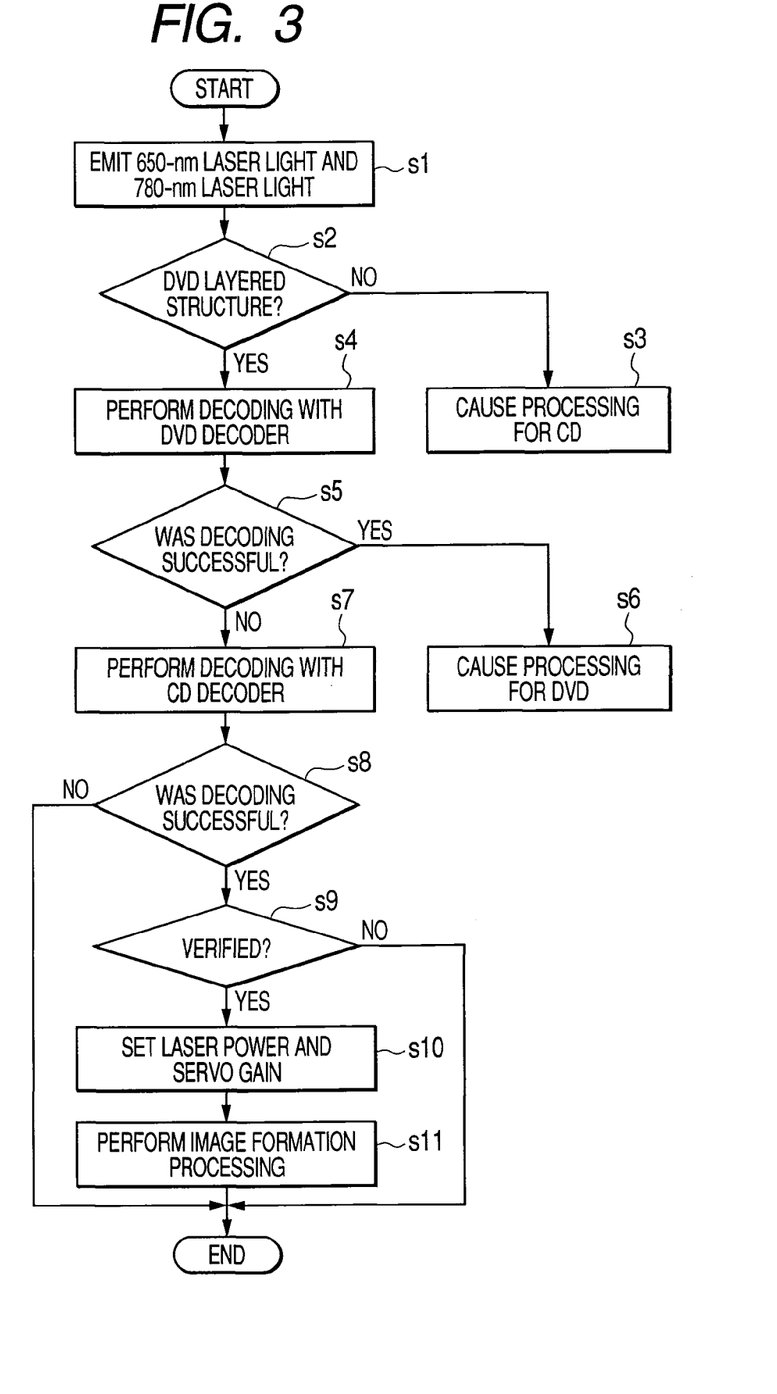
FIG. 3 is a flowchart for description of a visible image forming process of the optical disc processing apparatus.

Next, a visible image forming process of the optical disc processing apparatus 10 will be described with reference to a flowchart. FIG. 3 is a flowchart for description of the visible image forming process of the optical disc processing apparatus. Visible image formation processing whose execution is permitted at step s11 of this process is processing of forming a visible image on the label surface of the optical disc 200 by a visible image forming method of decomposing a visible image into dots that are arranged in the circumferential direction and the radial direction (arranged radially) and causing color changes at respective dot positions in accordance with dot densities. This processing corresponds to the "particular processing operation" of the invention.

When an optical disc is set in the optical disc processing apparatus 10, the control section 170 causes the spindle motor 130 to rotate the optical disc 200 by outputting a control signal to the servo circuit 138 and causes the optical pickup 100 to emit 650-nm laser light and 780-nm laser light simultaneously or sequentially toward the optical disc 200 by outputting a control signal to the ALPC circuit 162 (s1). Based on return light, the control section 170 judges the layered structure of the optical disc, that is, whether the focal plane height is of the DVD or the CD (s2). If the optical disc set is a CD, the control section moves to processing for a CD-type optical disc (s3).

On the other hand, if the optical disc is a DVD, the control section 170 outputs a control signal to the motor driver 142 and thereby causes the stepping motor 140 to move the optical pickup to a position where it will be opposed to the information recording area 212. Then, the control section 170 outputs a control signal to the ALPC circuit 162 and reads out, with 650-nm laser light, the disc information that is recorded in the information recording area 212 (s4). At this time, the DVD decoder 136b operates in the decoder 136. If the DVD decoder 136b succeeds in decoding the disc information (s5), the control section 170 moves to processing for a DVD-type optical disc (s6).

If the DVD decoder 136b fails to decode the disc information, the control section 170 causes the CD decoder 136a to decode the disc information (s7). If the CD decoder 136a succeeds in decoding the disc information, that is, if the disc information is in the CD format (s8), the control section 170 judges whether verification data included in the read-out disc information coincide with any of plural pieces of verification data stored in the parameter table of the ROM 171 (s9). If coincidence is found, the control section 170 sets the corresponding laser power and servo gain in the data converter 160 and the ALPC circuit 162 (s10) and permits execution of visible image formation processing (s11).

On the other hand, if the disc information stored in the information area 212 is not in the DVD format or the CD format (s8) or no verification data exist or verification data coincide with none of the verification data stored in the parameter table though the disc information is written in the CD format (s9), the control section 170 judges that it is impossible to form a visible image on the disc and finishes the process (an abnormal finish).

In the above flowchart, execution of visible image formation processing is permitted if the data of a DVD set can be decoded by the CD decoder and decoded data include particular contents (verification data). An alternative process is possible in which execution of visible image formation processing is permitted if CD format data are written (the contents of the data are not judged).

Although in the above embodiment the information recording area 212 of the optical disc 200 is formed as a track that is an array of pits, the information recording area 212 may be such that a pre-groove as used in writable discs is formed and verification data are written like ATIP (absolute time in pre-groove). For example, disc information may be written by snaking, in a cycle corresponding to 22.05 kHz, a pre-groove formed in a DVD disc substrate.

Although the above embodiment is directed to the optical disc processing apparatus for processing a DVD in which CD format data are written, the first-structure optical disc and the second-structure optical disc are not limited to the DVD and the CD and may be optical discs of other formats such as the Blu-ray Disc and the HD-DVD.

The invention claimed is:

1. An optical disc processing apparatus comprising:
a first reader that reads a modulation signal from a first-structure optical disc having a first layered structure;
a second reader that reads a modulation signal from a second-structure optical disc having a second layered structure;
a first decoder that decodes a modulation signal that is recorded in a format of the first-structure optical disc;
a second decoder that decodes a modulation signal that is recorded in a format of the second-structure optical disc; and
a disc judging unit that permits execution of a particular processing operation if a condition is satisfied that the second decoder succeeds in decoding a modulation signal read by the first reader from the first-structure optical disc that is set.

2. The optical disc processing apparatus according to claim 1, wherein the disc judging unit permits execution of the particular processing operation if a further condition is satisfied that data produced by the decoding by the second decoding means has particular contents.

3. The optical disc processing apparatus according to claim 1, wherein the first-structure optical disc is a DVD and the second-structure optical disc is a CD, and the modulation signal that is recorded in a format of the second-structure optical disc is an EFM signal that is written with a minimum pit length of 0.83 to 0.98 μm and a track pitch of 1.50 to 1.7 μm.

4. The optical disc processing apparatus according to claim 1, wherein the particular processing operation is processing of forming a visible image with laser light on a surface of the disc surface that is set.

5. An optical disc processing system comprising:
a first-structure optical disc having a first layered structure;
a second-structure optical disc having a second layered structure;
a first reader that reads a modulation signal from a first-structure optical disc having a first layered structure;

a second reader that reads a modulation signal from a second-structure optical disc having a second layered structure;

a first decoder that decodes a modulation signal that is recorded in a format of the first-structure optical disc;

a second decoder that decodes a modulation signal that is recorded in a format of the second-structure optical disc; and a disc judging unit that permits execution of a particular processing operation if a condition is satisfied that the second decoder succeeds in decoding a modulation signal read by the first reader from the first-structure optical disc that is set.

6. The optical disc processing system according to claim 5, wherein the disc judging unit permits execution of the particular processing operation if a further condition is satisfied that data produced by the decoding by the second decoding unit has particular contents.

7. The optical disc processing system according to claim 5, wherein the first-structure optical disc is a DVD and the second-structure optical disc is a CD, and the modulation signal that is recorded in a format of the second-structure optical disc is an EFM signal that is written with a minimum pit length of 0.83 to 0.98 µm and a track pitch of 1.50 to 1.70 µm.

8. The optical disc processing system according to claim 5, wherein the particular processing operation is processing of forming a visible image with laser light on a surface of the disc surface that is set.

9. An optical disc processing method comprising:

a first reading step of reading a modulation signal from a first-structure optical disc having a first layered structure;

a second reading step of reading a modulation signal from a second-structure optical disc having a second layered structure;

a first decoding step of decoding a modulation signal that is recorded in a format of the first-structure optical disc;

a second decoding step of decoding a modulation signal that is recorded in a format of the second-structure optical disc; and a disc judging step of permitting execution of a particular processing operation if a condition is satisfied that the second decoding step succeeds in decoding a modulation signal read by the first reading step from the first-structure optical disc that is set.

10. The optical disc processing method according to claim 9, wherein the disc judging step permits execution of the particular processing operation if a further condition is satisfied that data produced by the decoding by the second decoding step has particular contents.

11. The optical disc processing method according to claim 9, wherein the first-structure optical disc is a DVD and the second-structure optical disc is a CD, and the modulation signal that is recorded in a format of the second-structure optical disc is an EFM signal that is written with a minimum pit length of 0.83 to 0.98 µm and a track pitch of 1.50 to 1.70 µm.

12. The optical disc processing method according to claim 9, wherein the particular processing operation is processing of forming a visible image with laser light on a surface of the disc surface that is set.

* * * * *